(12) United States Patent
Cattani et al.

(10) Patent No.: US 8,146,542 B2
(45) Date of Patent: Apr. 3, 2012

(54) ADAPTIVE EGR COOLING SYSTEM

(75) Inventors: Luis Carlos Cattani, Aurora, IL (US); Peter Popadiuc, Bensenville, IL (US); Bashar Y. Melhem, Orland Park, IL (US); Martin R. Zielke, Lockport, IL (US)

(73) Assignee: International Engine Intellectual Property Company LLC, Lisle, IL (US)

( * ) Notice: Subject to any disclaimer, the term of this patent is extended or adjusted under 35 U.S.C. 154(b) by 456 days.

(21) Appl. No.: 12/511,441

(22) Filed: Jul. 29, 2009

(65) Prior Publication Data

US 2011/0023796 A1    Feb. 3, 2011

(51) Int. Cl.
*F01P 3/00* (2006.01)
(52) U.S. Cl. ............ 123/41.29; 123/540; 123/568.12; 123/568.11; 123/41.1; 123/41.51
(58) Field of Classification Search .............. 123/41.1, 123/41.51, 41.29, 568.12, 568.11, 540, 542, 123/562, 563; 60/599, 598, 600, 605.1, 605.2
See application file for complete search history.

(56) References Cited

U.S. PATENT DOCUMENTS

| | | | |
|---|---|---|---|
| 4,325,219 A * | 4/1982 | Stang et al. | 60/599 |
| 4,697,551 A * | 10/1987 | Larsen et al. | 123/41.31 |
| 4,885,911 A * | 12/1989 | Woollenweber et al. | 60/597 |
| 5,201,285 A * | 4/1993 | McTaggart | 123/41.31 |
| 5,394,854 A * | 3/1995 | Edmaier et al. | 123/563 |
| 5,415,147 A * | 5/1995 | Nagle et al. | 123/563 |
| 5,970,928 A | 10/1999 | Smietanski | |
| 6,244,256 B1 * | 6/2001 | Wall et al. | 123/568.12 |
| 6,401,700 B2 | 6/2002 | Balekai | |
| 6,508,212 B2 | 1/2003 | Song | |
| 6,718,935 B2 | 4/2004 | Meisner | |
| 6,772,742 B2 | 8/2004 | Lei | |
| 6,947,822 B2 | 9/2005 | Martinez, Jr. | |
| 6,959,700 B2 | 11/2005 | Wu | |
| 6,968,832 B1 | 11/2005 | Rowells | |
| 6,973,786 B1 | 12/2005 | Liu | |
| 7,017,561 B1 | 3/2006 | Liu | |
| 7,047,953 B2 | 5/2006 | Kennedy | |
| 7,089,890 B2 | 8/2006 | Obidi | |
| 7,117,843 B2 | 10/2006 | Liu | |
| 7,152,588 B2 | 12/2006 | Corba | |
| 7,168,250 B2 | 1/2007 | Wei | |
| 7,171,957 B2 | 2/2007 | Liu | |

(Continued)

*Primary Examiner* — Noah Kamen
*Assistant Examiner* — Hung Q Nguyen
(74) *Attorney, Agent, or Firm* — Mark C. Bach; Jeffrey P. Calfa

(57) ABSTRACT

A first loop contains engine coolant passageways (28, 30) and a first radiator (34). A second loop contains a first EGR cooler (48). A third loop contains a second EGR cooler (50), a second radiator (36), a charge air cooler (26LP), a first valve (66), and a second valve (64). Valve (64) apportions coolant flow entering an inlet (64A) to parallel flow paths, one including second radiator (36) and the other being a bypass around radiator (36). The apportioned flows merge into confluent flow to both an inlet of charge air cooler (26LP) and a first inlet (66B) of valve (66). Valve (66) has an outlet (66C) communicated to an inlet of second EGR cooler (50). The first condition of valve (66) closes a second inlet (66A) to coolant flowing toward both the second inlet (66A) and inlet (64A) while opening inlet (66B) to outlet (66C). The second condition of valve (66) opens second inlet (66A) to coolant flowing toward second inlet (66A) and inlet (64A) of the valve (64) while closing first inlet (66B) of valve (66) to outlet (66C) of valve (66).

24 Claims, 3 Drawing Sheets

U.S. PATENT DOCUMENTS

| | | |
|---|---|---|
| 7,184,877 B1 | 2/2007 | de Ojeda |
| 7,210,468 B1 | 5/2007 | Saele |
| 7,243,641 B2 | 7/2007 | Zukouski |
| 7,257,950 B2 | 8/2007 | Iwaszkiewicz |
| 7,287,378 B2 | 10/2007 | Chen |
| 7,299,771 B2 | 11/2007 | Wei |
| 7,305,976 B1 | 12/2007 | Clarke |
| 7,311,090 B2 | 12/2007 | Lyons |
| 2004/0074480 A1 | 4/2004 | Chen |
| 2004/0182372 A1 | 9/2004 | Kennedy |
| 2005/0115240 A1 | 6/2005 | Schueren |
| 2005/0205070 A1 | 9/2005 | Wu |
| 2005/0247294 A1 | 11/2005 | Rowells |
| 2006/0005791 A1 | 1/2006 | Obidi |
| 2006/0060171 A1 | 3/2006 | Liu |
| 2006/0075995 A1 | 4/2006 | Liu |
| 2006/0200297 A1 | 9/2006 | Liu |
| 2007/0039597 A1 | 2/2007 | Zukouski |
| 2007/0089716 A1 | 4/2007 | Saele |
| 2007/0157893 A1 | 7/2007 | Wei |
| 2007/0175457 A1 | 8/2007 | Lyons |
| 2007/0266999 A1 | 11/2007 | Clarke |
| 2008/0115747 A1 | 5/2008 | Snyder |
| 2008/0223329 A1 | 9/2008 | Preimesberger |
| 2009/0139500 A1 | 6/2009 | Gronberg |

* cited by examiner

ADAPTIVE EGR COOLING SYSTEM

TECHNICAL FIELD

This disclosure relates to internal combustion engines, especially diesel engines in motor vehicles, that use exhaust gas recirculation (EGR) as a component of tailpipe emission control strategy.

BACKGROUND OF THE DISCLOSURE

A typical EGR system of an engine includes one or more EGR valves for controlling the flow of engine exhaust gas from the engine's exhaust system to the engine's intake system to meter an appropriate amount of exhaust gas into fresh air passing through the intake system where the air supports combustion of fuel in the engine's cylinders. The metered exhaust gas in effect dilutes the air so that in-cylinder temperature rise resulting from combustion is limited from that which would occur in the absence of such dilution. As a consequence, the quantity of oxides of nitrogen (NOx) in the exhaust gas that results from combustion is also limited.

Some EGR systems, especially those designed for compression ignition (i.e. diesel) engines, have one or more heat exchangers for cooling recirculated exhaust gas. Cooling of the exhaust gas can further limit the generation of NOx.

It is recognized in the industry that cooling of recirculated exhaust gas creates the potential for condensation of certain gaseous constituents of the exhaust gas. Control of condensation may be a factor in the design of various engine systems.

SUMMARY OF THE DISCLOSURE

This disclosure relates to an internal combustion engine comprising engine structure comprising engine cylinders within which fuel is combusted to operate the engine and coolant passageways, an intake system for conveying air to the engine cylinders to support fuel combustion and comprising a charge air cooler for cooling conveyed air, an exhaust system for conveying combustion-created exhaust gas from the cylinders, an EGR system for recirculating some exhaust gas from the exhaust system successively through a first heat exchanger and a second heat exchanger to the intake system for entrainment with air being conveyed to the cylinders and a cooling system for circulating liquid coolant in multiple loops and comprising first and second radiators.

A first of the loops comprises the coolant passageways where heat from the engine structure is transferred to coolant and the first radiator where heat in coolant that has passed through the coolant passageways is rejected.

A second of the loops comprises one of the first and second heat exchangers.

A third of the loops comprises the other of the first and second heat exchangers, the second radiator, the charge air cooler, a first valve that is selectively operable to first and second conditions, and a second valve that is operable to selectively apportion coolant flow entering an inlet of the second valve to parallel flow paths, one of which includes the second radiator and the other of which bypasses the second radiator, and which merge into confluent flow downstream of the second radiator to convey coolant to both an inlet of the charge air cooler and a first inlet of the first valve. The first valve has an outlet communicated an inlet of the other of the first and second heat exchangers.

The first condition of the first valve closes a second inlet of the first valve to coolant flowing toward both the second inlet of the first valve and the first inlet of the second valve while opening the first inlet of the first valve to the outlet of the first valve.

The second condition of the first valve opens the second inlet of the first valve to coolant flowing toward the second inlet of the first valve and the first inlet of the second valve while closing the first inlet of the first valve to the outlet of the first valve.

The disclosure also relates to a circuit for cooling both exhaust gas being recirculated through an EGR system of an internal combustion engine and charge air for supporting combustion in engine combustion chambers.

The circuit comprises a first loop comprising coolant passageways in engine structure containing where coolant absorbs heat from the engine structure and a first radiator where heat absorbed by coolant is rejected, a second loop comprising a first EGR cooler, and a third loop comprising a second EGR cooler, a second radiator, a charge air cooler for cooling charge air entering the engine, a first valve that is selectively operable to first and second conditions, and a second valve that is operable to selectively apportion coolant flow entering an inlet of the second valve to parallel flow paths, one of which includes the second radiator and the other of which bypasses the second radiator, and which merge into confluent flow downstream of the second radiator to convey coolant to both an inlet of the charge air cooler and a first inlet of the first valve. The first valve has an outlet communicated an inlet of the second EGR cooler.

The first condition of the first valve closes a second inlet of the first valve to coolant flowing toward both the second inlet of the first valve and the first inlet of the second valve while opening the first inlet of the first valve to the outlet of the first valve.

The second condition of the first valve opens the second inlet of the first valve to coolant flowing toward the second inlet of the first valve and the first inlet of the second valve while closing the first inlet of the first valve to the outlet of the first valve.

The disclosure also relates to a method for cooling both exhaust gas being recirculated through an EGR system of an internal combustion engine and charge air for supporting combustion in engine combustion chambers.

The method comprises: circulating liquid coolant in a first loop comprising coolant passageways in engine structure where heat from the engine structure is transferred to coolant and a first radiator where heat in coolant that has passed through the coolant passageways is rejected; circulating liquid coolant in a second loop comprising a first EGR cooler; and circulating liquid coolant in a third loop comprising a second EGR cooler, a second radiator, a charge air cooler for cooling charge air entering the engine, a selectively operable first valve, and a second valve for selectively apportioning coolant flow entering an inlet of the second valve to parallel flow paths, one of which includes the second radiator and another of which bypasses the second radiator, and which merge into confluent flow downstream of the second radiator to convey coolant to both an inlet of the charge air cooler and a first inlet of the first valve, the first valve having an outlet communicated an inlet of the second EGR cooler.

The method further comprises selectively operating the first valve to a first condition closing a second inlet of the first valve to coolant flowing toward both the second inlet of the first valve and the first inlet of the second valve while opening the first inlet of the first valve to the outlet of the first valve, and to the second condition opening the second inlet of the first valve to coolant flowing toward the second inlet of the first valve and the first inlet of the second valve while closing the first inlet of the first valve to the outlet of the first valve, and operating the second valve to selectively apportion coolant flow entering the inlet of the second valve to the parallel flow paths.

The foregoing summary is accompanied by further detail of the disclosure presented in the Detailed Description below with reference to the following drawings that are part of this disclosure.

DETAILED DESCRIPTION

Figure 1:
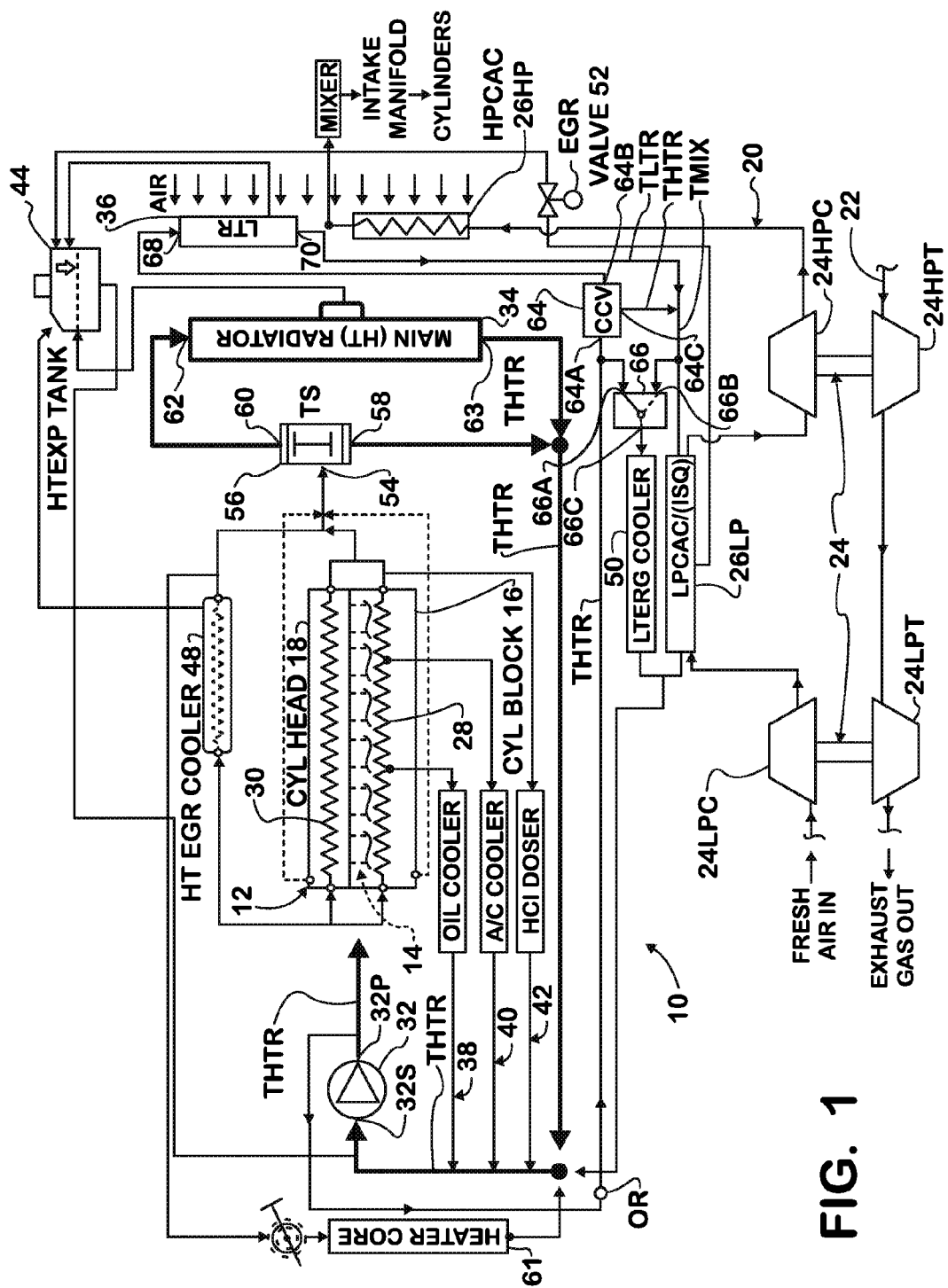
FIG. 1 is a schematic diagram showing a first embodiment of the disclosed system in an engine.

FIG. 1 shows a diesel engine 10 that comprises structure 12 containing engine cylinders 14 within which combustion of fuel occurs to operate the engine, such structure typically comprising a cylinder block 16 and one or more cylinder heads 18 depending on the particular type of engine block (such as an I-engine or a V-engine block). Engine 10 also comprises an air intake system 20 for conveying fresh air/ EGR to cylinders 14 where the air supports the combustion of fuel. Engine 10 further comprises an exhaust system 22 for conveying combustion-created exhaust gas from cylinders 14 to a tailpipe through which the gas is discharged.

Engine 10 also comprises a turbocharger 24 shown as a two-stage turbocharger having a high-pressure turbine 24HPT and a low-pressure turbine 24LPT both operated by exhaust gas from cylinders 14 for operating respective high-pressure and low-pressure compressors 24HPC and 24LPC that draw fresh air into intake system 20 to create charge air for the engine. Because the compression of the air elevates its temperature, the compressed air leaving the low-pressure compressor stage flows first through a low-pressure charge air cooler (LPCAC) 26LP (sometimes also called an inter-stage cooler or ISC) where some heat is rejected before the charge air is further compressed by high-pressure compressor 24HPC. A high-pressure charge air cooler (HPCAC) 26HP cools the air coming from the high-pressure compressor stage before it is delivered to a mixer where it may mix with recirculated exhaust gas before finally entering cylinders 14 through an intake manifold.

Engine 10 comprises a liquid cooling system that includes a system of coolant passageways 28 in block 16 and a system of coolant passageways 30 in head 18. Liquid coolant is circulated through the cooling system by a pump 32, which by way of example is an engine-driven coolant pump. The circulating coolant absorbs engine heat as it passes through the systems of passageways 28, 30 and rejects absorbed heat to air passing through a high-temperature (HT) radiator 34. When engine 10 is the powerplant of a motor vehicle such as a large truck, radiator 34 is typically a liquid-to-air heat exchanger. The cooling system also comprises a low-temperature (LT) radiator 36 that may also be a liquid-to-air heat exchanger.

Coolant circulates through various loops that include passageways in block 16 and/or head 18 but do not include either radiator 34 or 36. Loops 38, 40, and 42 are examples of such loops. An expansion tank 44 can collect overflow coolant from various locations in the cooling system, such as those shown, and provide for return of coolant to a suction inlet 32S of pump 32.

The flow in any flow loop passing through HT radiator 34 leaves HT radiator 34 at a temperature $T_{HTR}$.

Engine 10 also comprises an EGR system for recirculating some exhaust gas from exhaust system 22 in succession through a first heat exchanger 48, sometimes called a high-temperature (HT) EGR cooler, and a second heat exchanger 50, also sometimes called a low-temperature (LT) EGR cooler, to the mixer in intake system 20 for entrainment with the charge air flowing to cylinders 14. An EGR valve 52 controls the recirculation flow. Although the recirculation flow path and the pierce points to intake system 20 and to exhaust system 22 are not specifically shown in FIG. 1, the pierce point to exhaust system 22 can be upstream of high-pressure turbine 24HPT and the pierce point to intake system 20 can be downstream of high-pressure compressor 24HPC. The recirculation flow path may comprise EGR valve 52, HT EGR cooler 48 and LT EGR cooler 50 in that order from the pierce point to exhaust system 22 to the pierce point to intake system 20. The overflow coolant path from (LPCAC) 26LP that is shown passing through EGR valve 52 passes through a passageway in the EGR valve body to provide some cooling for the EGR valve which happens to be close-coupled to an engine exhaust manifold.

Pump 32 pumps coolant in parallel paths through HT EGR cooler 48, coolant passageways 28, and coolant passageways 30. Flows through those parallel paths confluently enter an inlet 54 of a temperature-controlled valve 56, such as a thermostat, that comprises two outlets 58, 60. Outlet 58 is in fluid communication with the suction inlet 32S of pump 32, and outlet 60 is in fluid communication with an inlet 62 of HT radiator 34. HT radiator 34 has an outlet 63 also in communication with suction inlet 32S. Coolant for a heater core 61 that heats the interior of an occupant compartment in a motor vehicle that is powered by engine 10 is shown being supplied from the outlet of HT EGR cooler 48, but could be supplied from any other source that provides suitably high temperature.

An outlet 32P outlet of pump 32 is in fluid communication both with an inlet 64A of a CCV valve 64 and with an inlet 66A of a switch valve 66. CCV valve 64 comprises an outlet 64B that is in fluid communication with an inlet 68 of LT radiator 36 and an outlet 64C that is in fluid communication both with an inlet 66B of switch valve 66 and an inlet of low-pressure charge air cooler 26LP. LT radiator 36 has an outlet 70 that is in fluid communication both with inlet 66B of switch valve 66 and with the inlet of low-pressure charge air cooler 26LP.

Switch valve 66 has an outlet 66C that is in fluid communication with an inlet of LT EGR cooler 50. Outlets of LT EGR cooler 50 and low-pressure charge air cooler 26LP are in fluid communication with suction inlet 32S of pump 32.

Switch valve 66 is selectively operable to a first state in which inlet 66A communicates with outlet 66C while inlet 66B is closed to inlet 66A and outlet 66C, and to a second state in which inlet 66B communicates with outlet 66C while inlet 66A is closed to inlet 66B and outlet 66C.

Before engine 10 attains operating temperature, temperature-controlled valve 56 blocks flow of coolant from block 16 and head 18 to HT radiator 34 and returns the flow directly to suction inlet 32S of pump 32. When engine 10 attains operating temperature, valve 56 forces flow of coolant from block 16 and head 18 through HT radiator 34 before the flow returns to suction inlet 32S.

Coolant leaving HT radiator 34 via outlet 63 flows to pump suction inlet 32S, through pump 32, to inlet 66A of switch valve 66 and inlet 64A of CCV valve 64. While there may be some differences in actual coolant temperature at various points along this flow path, coolant temperature at any point may be considered to be $T_{HTR}$, as marked in FIG. 1. An orifice OR provides a proper flow rate for balancing flow along this flow path in this relation to other coolant system flows.

CCV valve 64 can apportion coolant entering inlet 64A between two parallel branches from the respective outlets 64B, 64C. The branch from outlet 64B contains LT radiator 36 and the other branch from outlet 64C is a bypass around LT radiator 36. CCV valve 64 controls the temperature of coolant flowing through LT EGR cooler 50 for managing exhaust gas condensation.

CCV valve 64 is controlled to apportion the flows through the respective branches as a function of certain variables related to air, coolant, and exhaust gas properties. The variables that are used may be measured in any suitably appropriate way such as by sensors (real and/or virtual) and/or estimated or inferred using suitable models. Any particular control strategy will depend on the particular engine and particular objective(s) to be achieved at various engine operating conditions. Different strategies may be used in different engines and to accomplish different control objectives. CCV valve 64 can function to apportion the branch flows such that 100% of the entering flow passes through one branch and 0% through the other, and vice versa. It can also divide the flows such that some percentage less than 100% of the entering flow passes through one branch and the remainder through the other branch.

When switch valve 66 is placed in its first state (inlet 66A communicating with outlet 66C while inlet 66B is closed to inlet 66A and outlet 66C), the system of FIG. 1 functions in the following manner.

Coolant entering switch valve 66 from pump 32 has a temperature $T_{HTR}$. The temperature of coolant entering the inlet of low-pressure charge air cooler 26LP is designated $T_{MIX}$ and that temperature is controlled by CCV valve 64.

If CCV valve 64 closes outlet 64B to flow, the entire flow entering inlet 64A exits via outlet 64C and passes through low-pressure charge air cooler 26LP, causing the temperature of coolant entering charge air cooler 26LP to be the temperature $T_{HTR}$.

The temperature of coolant coming from outlet 70 of LT radiator 36 is marked $T_{LTR}$. The quantity of coolant heat that is being rejected at LT radiator 36 determines how much lower the temperature $T_{LTR}$ is than the temperature $T_{HTR}$. If CCV valve 64 is closing outlet 64C to flow, the entire flow entering inlet 64A exits via outlet 64B and passes through LT radiator 36 before entering low-pressure charge air cooler 26LP, causing the temperature $T_{MIX}$ of coolant entering charge air cooler 26LP to equal the temperature $T_{LTR}$.

If CCV valve 64 is apportioning the entering flow between outlets 64B and 64C, one portion of the flow is cooled by LT radiator 36 while the remainder is not. In this instance the temperature $T_{MIX}$ of coolant entering charge air cooler 26LP will be lower than the temperature $T_{HTR}$ but higher than the temperature $T_{LTR}$, with the specific temperature being a function of the extent to which CCV valve 64 is apportioning the flow through the respective branches.

When switch valve 66 is placed in its second state in which inlet 66B communicates with outlet 66C while inlet 66A is closed to inlet 66B and outlet 66C, coolant entering switch valve 66 has the same temperature $T_{MIX}$ as coolant entering low-pressure charge air cooler 26LP. With the value of $T_{MIX}$ being controlled by CCV valve 64, the temperature of coolant entering both charge air cooler 26LP and LT EGR cooler 50 is controlled by controlling CCV valve 64 in the same manner as described above.

Placing switch valve 66 in its second state, allows switch valve 66 to concurrently control both EGR cooling and charge air cooling. When EGR needs less cooling, such as to mitigate EGR condensation, placing switch valve 66 in its first state allows coolant having temperature $T_{HTR}$ to pass through LT EGR cooler 50 for mitigating EGR condensation, while the temperature $T_{MIX}$ of coolant entering charge air cooler 26LP can still be controlled by CCV valve 64 to cause the temperature of coolant passing through charge air cooler 26LP to be lower than that of coolant passing through LT EGR cooler 50 continuing the greater cooling of charge air that increases charge air density, and hence improves performance of turbocharger 24.

FIG. 1 shows HT EGR cooler 48 to be in parallel flow relationship to passageways 28, 30 before the parallel flows merge to confluently pass through temperature-controlled valve 56 before returning either directly or through radiator 34 to suction inlet 32S of pump 32 as determined by temperature of coolant leaving block 16/head 18 (that temperature corresponding to engine operating temperature).

The flow from pump outlet 32P through passageways 28, 30 and either directly, or through HT radiator 34, back to suction inlet 32S may be considered a first flow loop.

The flow from pump outlet 32P through HT EGR cooler 48 and either directly, or through HT radiator 34, back to suction inlet 32S as controlled by valve 56, may be considered a second flow loop.

Flow from pump outlet 32P to valves 64, 66, and subsequently as controlled by valves 64, 66 before returning to suction inlet 32S may be considered a third flow loop.

Figure 2:
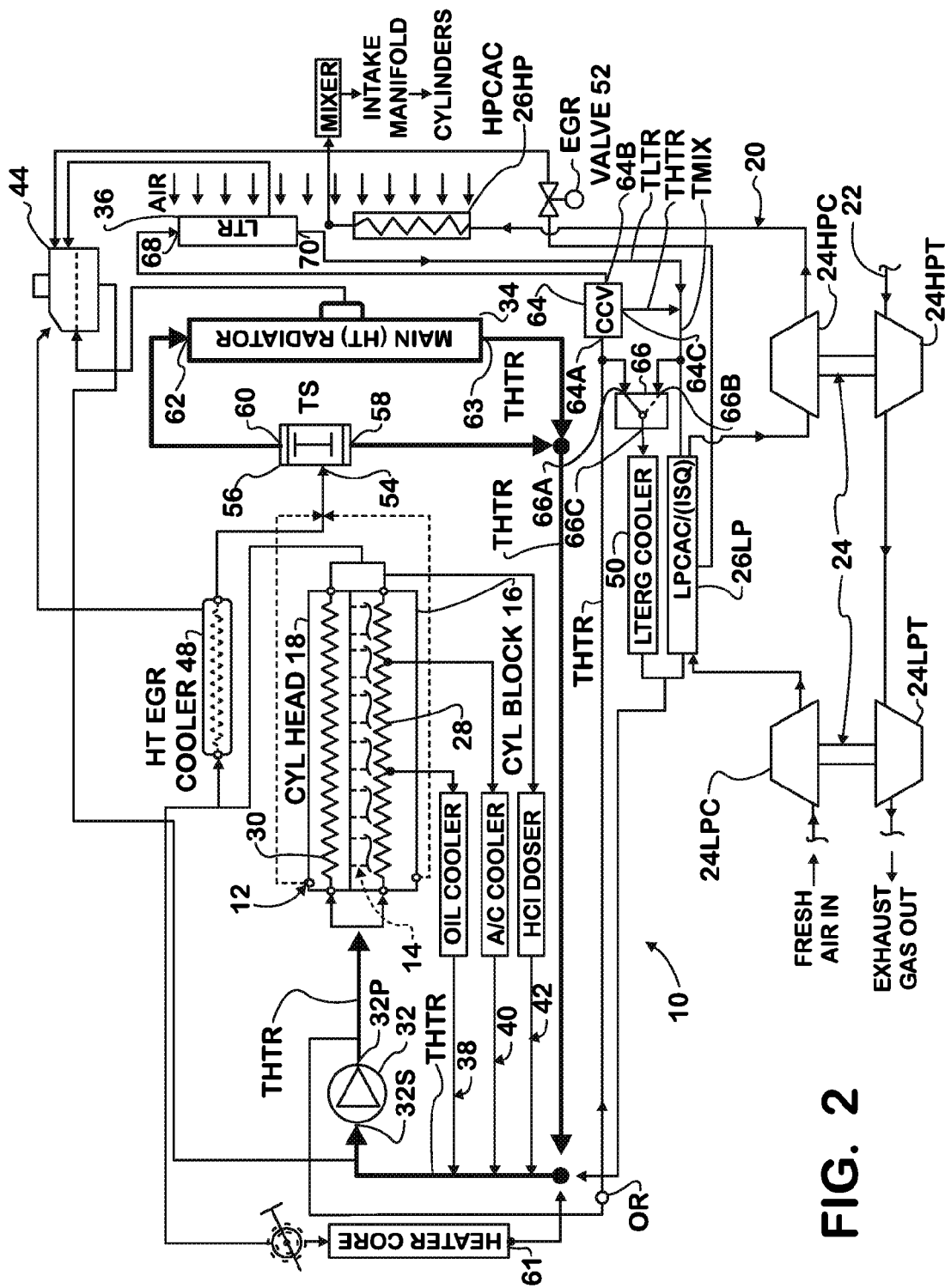
FIG. 2 is a schematic diagram showing a second embodiment of the disclosed system in an engine.

FIG. 2 shows an embodiment in which the same reference numerals designate the same elements shown and described in connection with FIG. 1. FIG. 2 differs from FIG. 1 in that the flow to HT EGR cooler 48 has passed through engine passageways 28, 30 rather than coming directly from pump outlet 32P. Consequently, when engine 10 is running at operating temperature, hotter coolant is delivered to HT EGR cooler 48 than when coolant is supplied directly from pump outlet 32P. Flow to CCV valve 64 and switch valve 66 continues to come directly from pump outlet 32P. Coolant for heater core 61 is supplied from the outlets of engine passageways 28, 30.

Figure 3:
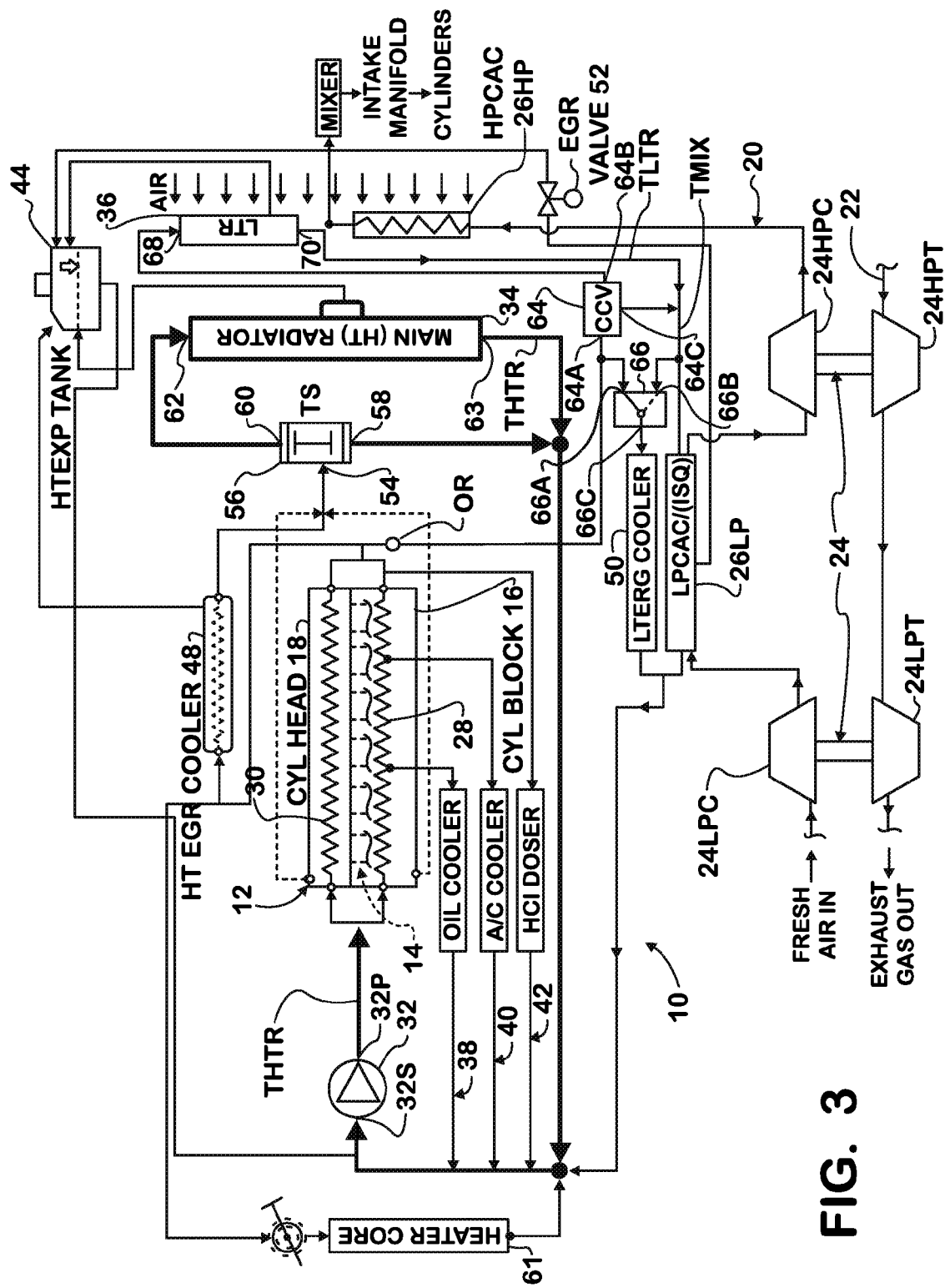
FIG. 3 is a schematic diagram showing a third embodiment of the disclosed system in an engine.

FIG. 3 shows an embodiment in which the same reference numerals designate the same elements shown and described in connection with FIG. 1. FIG. 3 differs from FIG. 1 in that the flows to HT EGR cooler 48 and to CCV valve 64 and switch valve 66 have passed through passageways 28, 30 rather than coming directly from pump outlet 32P. Consequently, when engine 10 is running at operating temperature, hotter coolant is delivered to HT EGR cooler 48 and to CCV valve 64 and switch valve 66 than when coolant is supplied directly from pump outlet 32P. Coolant for heater core 61 is supplied from the outlets of engine passageways 28, 30.

What is claimed is:
1. An internal combustion engine comprising:
engine structure comprising engine cylinders within which fuel is combusted to operate the engine and coolant passageways;
an intake system for conveying air to the engine cylinders to support fuel combustion and comprising a charge air cooler for cooling the air;
an exhaust system for conveying combustion-created exhaust gas from the cylinders;

an EGR system for recirculating some exhaust gas from the exhaust system successively through a first heat exchanger and a second heat exchanger to the intake system for entrainment with air being conveyed to the cylinders;

a cooling system for circulating liquid coolant in multiple loops and comprising first and second radiators;

a first of the loops comprising the coolant passageways where heat from the engine structure is transferred to coolant and the first radiator where heat in coolant that has passed through the coolant passageways is rejected;

a second of the loops comprising one of the first and second heat exchangers; and a third of the loops comprising the other of the first and second heat exchangers, the second radiator, a charge air cooler, a first valve that is selectively operable to first and second conditions, and a second valve that is operable to selectively apportion coolant flow entering an inlet of the second valve to parallel flow paths, one of which includes the second radiator and another of which bypasses the second radiator, and which merge into confluent flow downstream of the second radiator to both an inlet of the charge air cooler and a first inlet of the first valve, the first valve having an outlet communicated an inlet of the other of the first and second heat exchangers;

the first condition of the first valve closing a second inlet of the first valve to coolant flowing toward both the second inlet of the first valve and the first inlet of the second valve while opening the first inlet of the first valve to the outlet of the first valve, and the second condition of the first valve opening the second inlet of the first valve to coolant flowing toward the second inlet of the first valve and the first inlet of the second valve while closing the first inlet of the first valve to the outlet of the first valve.

2. An engine as set forth in claim 1 in which the one heat exchanger is the first heat exchanger, and the other heat exchanger is the second heat exchanger.

3. An engine as set forth in claim 2 in which the cooling system comprises a pump for circulating coolant through the loops, and in which a portion of the first loop that comprises the coolant passageways in the engine structure and a portion of the second loop that comprises the first heat exchanger are in parallel flow relationship between an outlet of the pump and an inlet of the first radiator.

4. An engine as set forth in claim 3 further including a temperature-controlled valve for disallowing coolant that has flowed through the portion of the first loop that comprises the coolant passageways in the engine structure and the portion of the second loop that comprises the first heat exchanger to flow to the first radiator until the coolant attains at least some minimum temperature.

5. An engine as set forth in claim 2 in which the cooling system comprises a pump for circulating coolant through the loops, and in which a portion of the first loop that comprises the coolant passageways in the engine structure and a portion of the second loop that comprises the first heat exchanger are in series flow relationship between an outlet of the pump and an inlet of the first radiator.

6. An engine as set forth in claim 5 in which a portion of the third loop includes the portion of the first loop that comprises the coolant passageways in the engine structure.

7. An engine as set forth in claim 6 further including a temperature-controlled valve for disallowing coolant that has flowed through both the portion of the first loop that comprises the coolant passageways in the engine structure and the portion of the second loop that comprises the first heat exchanger to flow to the first radiator until the coolant attains at least some minimum temperature.

8. An engine as set forth in claim 5 further including a temperature-controlled valve for disallowing coolant that has flowed through both the portion of the first loop that comprises the coolant passageways in the engine structure and the portion of the second loop that comprises the first heat exchanger to flow to the first radiator until the coolant attains at least some minimum temperature.

9. An engine as set forth in claim 2 in which the cooling system comprises a pump for circulating coolant through the loops, the temperature of coolant leaving an outlet of the pump is substantially equal to the temperature of coolant flowing from an outlet of the first radiator to an inlet of the pump, and the temperature of coolant flowing from the pump outlet to the second inlet of the first valve and the first inlet of the second valve is substantially equal to the temperature of coolant leaving the outlet of the pump.

10. An engine as set forth in claim 2 in which the cooling system comprises a pump for circulating coolant through the loops by pumping coolant from an outlet of the pump through the coolant passageways, and in which a portion of each loop comprises the coolant passageways.

11. An engine as set forth in claim 1 in which the intake system comprises at least one compressor for compressing air passing through the intake system, and the charge air cooler cools air that has been compressed by the at least one compressor.

12. An engine as set forth in claim 11 in which the charge air cooler cools air that has been compressed by a low-pressure compressor stage before further compression by a high-pressure stage.

13. A circuit for cooling both exhaust gas being recirculated through an EGR system of an internal combustion engine and charge air for supporting combustion in engine combustion chambers, the circuit comprising:

a first loop comprising coolant passageways in engine structure where heat from the engine structure is transferred to coolant and a first radiator where heat in coolant that has passed through the coolant passageways is rejected;

a second loop comprising a first EGR cooler; and a third loop comprising a second EGR cooler, a second radiator, a charge air cooler for cooling charge air entering the engine, a first valve that is selectively operable to first and second conditions, and a second valve that is operable to selectively apportion coolant flow entering an inlet of the second valve to parallel flow paths, one of which includes the second radiator and another of which bypasses the second radiator, and which merge into confluent flow downstream of the second radiator to convey coolant to both an inlet of the charge air cooler and a first inlet of the first valve, the first valve having an outlet communicated an inlet of the second EGR cooler;

the first condition of the first valve closing a second inlet of the first valve to coolant flowing toward both the second inlet of the first valve and the first inlet of the second valve while opening the first inlet of the first valve to the outlet of the first valve, and the second condition of the first valve opening the second inlet of the first valve to coolant flowing toward the second inlet of the first valve and the first inlet of the second valve while closing the first inlet of the first valve to the outlet of the first valve.

14. A circuit as set forth in claim 13 comprising a pump for circulating coolant through the loops, and in which a portion of the first loop that comprises the coolant passageways in the engine structure and a portion of the second loop that comprises the first EGR cooler are in parallel flow relationship between an outlet of the pump and an inlet of the first radiator.

15. A circuit as set forth in claim 14 further including a temperature-controlled valve for disallowing coolant that has flowed through the portion of the first loop that comprises the coolant passageways in the engine structure and the portion of the second loop that comprises the first EGR cooler to flow to the first radiator until the coolant attains at least some minimum temperature.

16. A circuit as set forth in claim 13 comprises a pump for circulating coolant through the loops, and in which a portion of the first loop that comprises the coolant passageways in the engine structure and a portion of the second loop that comprises the first EGR cooler are in series flow relationship between an outlet of the pump and an inlet of the first radiator.

17. A circuit as set forth in claim 16 in which a portion of the third loop includes the portion of the first loop that comprises the coolant passageways in the engine structure.

18. A circuit as set forth in claim 17 further including a temperature-controlled valve for disallowing coolant that has flowed through both the portion of the first loop that comprises the coolant passageways in the engine structure and the portion of the second loop that comprises the first EGR cooler to flow to the first radiator until the coolant attains at least some minimum temperature.

19. A circuit as set forth in claim 16 further including a temperature-controlled valve for disallowing coolant that has flowed through both the portion of the first loop that comprises the coolant passageways in the engine structure and the portion of the second loop that comprises the first EGR cooler to flow to the first radiator until the coolant attains at least some minimum temperature.

20. A circuit as set forth in claim 13 comprising a pump for circulating coolant through the loops, the temperature of coolant leaving an outlet of the pump is substantially equal to the temperature of coolant flowing from an outlet of the first radiator to an inlet of the pump, and the temperature of coolant flowing from the pump outlet to the second inlet of the first valve and the first inlet of the second valve is substantially equal to the temperature of coolant leaving the outlet of the pump.

21. A circuit as set forth in claim 13 comprising a pump for circulating coolant through the loops by pumping coolant from an outlet of the pump through the coolant passageways, and in which a portion of each loop comprises the coolant passageways.

22. A circuit as set forth in claim 13 in which the charge air cooler cools air that has been compressed by a compressor in an intake system of the engine.

23. A circuit as set forth in claim 13 in which the charge air cooler cools air that has been compressed by a low-pressure compressor stage of a two-stage compressor before further compression by a high-pressure stage.

24. A method for cooling both exhaust gas being recirculated through an EGR system of an internal combustion engine and charge air for supporting combustion in engine combustion chambers, the method comprising:
circulating liquid coolant in a first loop comprising coolant passageways in engine structure where heat from the engine structure is transferred to coolant and a first radiator where heat in coolant that has passed through the coolant passageways is rejected;
circulating liquid coolant in a second loop comprising a first EGR cooler; and
circulating liquid coolant in a third loop comprising a second EGR cooler, a second radiator, a charge air cooler for cooling charge air entering the engine, a selectively operable first valve, and a second valve for selectively apportioning coolant flow entering an inlet of the second valve to parallel flow paths, one of which includes the second radiator and another of which bypasses the second radiator, and which merge into confluent flow downstream of the second radiator to convey coolant to both an inlet of the charge air cooler and a first inlet of the first valve, the first valve having an outlet communicated an inlet of the second EGR cooler;
selectively operating the first valve to a first condition closing a second inlet of the first valve to coolant flowing toward both the second inlet of the first valve and the first inlet of the second valve while opening the first inlet of the first valve to the outlet of the first valve, and to the second condition opening the second inlet of the first valve to coolant flowing toward the second inlet of the first valve and the first inlet of the second valve while closing the first inlet of the first valve to the outlet of the first valve; and
operating the second valve to selectively apportion coolant flow entering the inlet of the second valve to the parallel flow paths.

* * * * *